No. 872,124. PATENTED NOV. 26, 1907.
T. F. HAMMARÉN.
BICYCLE AND MOTOR BICYCLE SADDLE.
APPLICATION FILED AUG. 17, 1906.
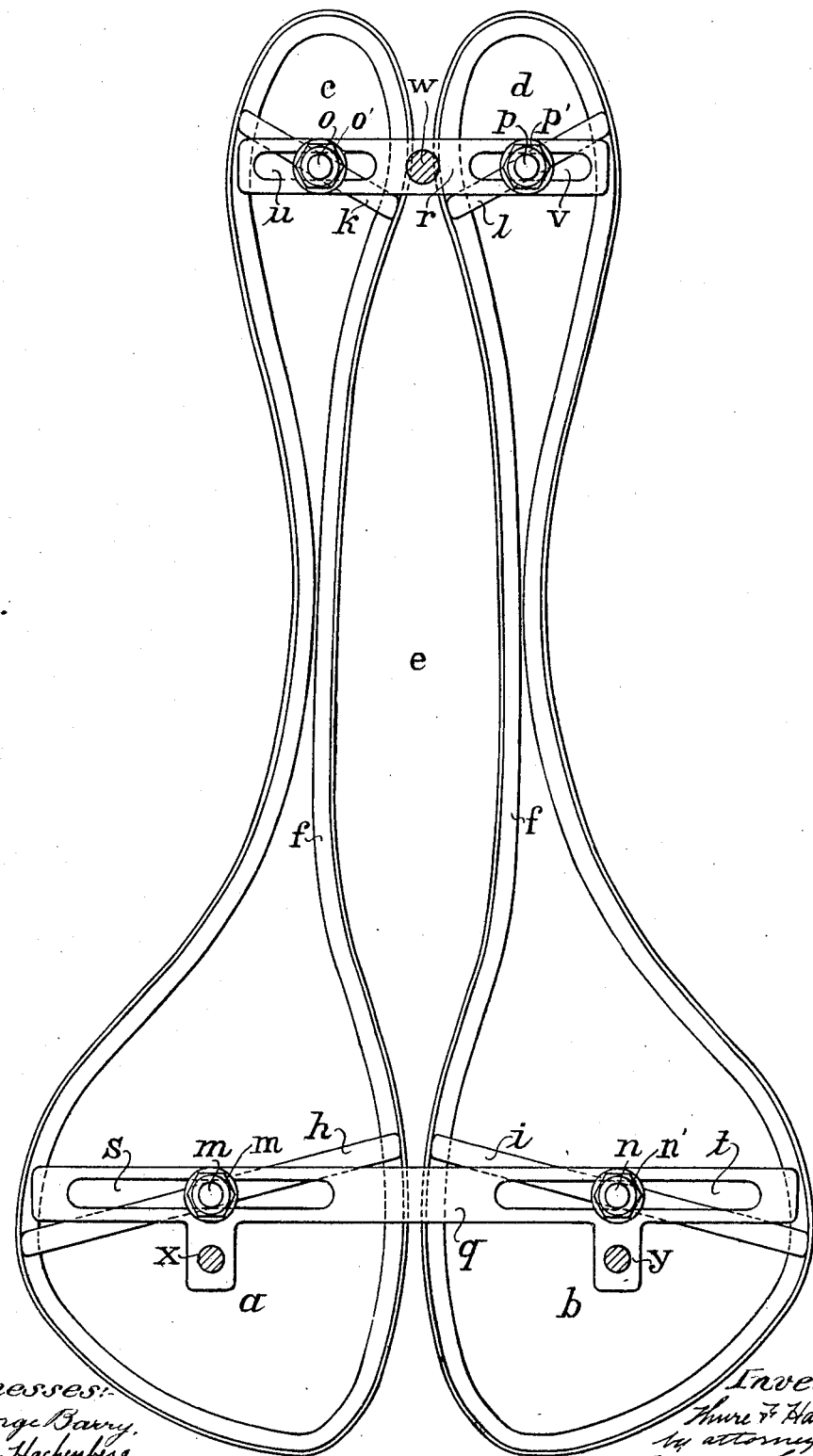

UNITED STATES PATENT OFFICE.

THURE FREDRIK HAMMARÉN, OF KOETZSCHENBRODA, NEAR DRESDEN, GERMANY.

BICYCLE AND MOTOR-BICYCLE SADDLE.

No. 872,124.          Specification of Letters Patent.          Patented Nov. 26, 1907.

Application filed August 17, 1906. Serial No. 330,955.

*To all whom it may concern:*

Be it known that I, THURE FREDRIK HAMMARÉN, a subject of the King of Sweden, and resident of Meissnerstrasse 9, Koetzschenbroda, near Dresden, Kingdom of Saxony, German Empire, have invented a new and useful Bicycle and Motor-Bicycle Saddle, of which the following is a specification.

The object of this invention is to provide a saddle of such construction and so shaped that it will present an easy and safe seat for the rider, that the genitals of the rider will be protected from injury, and that the saddle may also be held steadily and comfortably between the legs of the rider.

Referring now to the accompanying drawing, the same is a plan view of the saddle according to the present invention showing the same approximately in full size and giving a full view of the two separated suitably curved and elongated halves and the open space between the two as well as of the means for adjusting these halves to each other in the most convenient position.

$a$ and $b$ are the two saddle halves, the one having the extended end $c$ and the other the extended end $d$, these halves leaving between them the open space $e$.

$f, f$ are the suitably curved frames of the two saddle halves which are covered with any appropriate material, such as leather or the like, and to which are fastened the bars $h, i, k, l$, carrying threaded bolts $m, n, o, p$, on which are the clamping nuts $m', n', o', p'$.

$q, r$, are cross bars for connecting the two saddle halves at the front and rear ends, the cross bar $q$ having two elongated slots $s, t$, and the cross bar $r$ having two elongated slots $u, v$ for receiving the aforesaid bolts $m, n, o, p$. These clamping nuts $m', n', o', p'$, will serve to secure the cross bars tightly to the bars attached to the framework, thus keeping the two saddle halves in the desired adjusted position. It will be understood, that by this means the bolts will be able, after releasing the clamping nuts to slide along in the slots and it thus will be possible to bring the saddle halves nearer to or further apart from each other either at the front or the rear end of the saddle or at both, thereby reducing or increasing the open space between the halves. To the middle part $w$ of the front cross bar $r$ and at the points $x$ and $y$ of the back bar $q$ will be fixed the saddle spring and the further parts for securing the saddle to the machine, not shown herein.

It will be seen by the above description and accompanying drawing that the principal feature of my invention lies in providing an elongated pommel to a saddle split absolutely into two separated adjustable halves showing curved edges on their outside as well as on their inside and having a convenient space between their inner edges for receiving the genitals of the rider, said saddle thus securing a broad safe and well ventilated seat for the rider and distributing his weight and so caused pressure only to the inner parts of his upper thighs and his seat, whereas the genitals and all tender parts are absolutely released from any unhealthy and undue pressure. At the same time the saddle according to the invention will by giving the rider a firm and steady seat prevent him from pressing spasmodically with his arms on the handle bars and leaning thereon with his whole weight, while on the other hand it will enable him to fully make use of the strength of his legs for treading the pedals, thus in every way meeting with the requirements of a perfect saddle from a practical and hygienic point of view.

Having now fully described my invention, what I claim as new, and desire to secure by Letters Patent, is:—

1. In a bicycle saddle, two metal frames forming the saddle halves, having front extensions forming an elongated pommel, said halves having their outer edges curved to correspond to a human upper thigh and having their inner edges curved away from each other at the middle part of the saddle to form a broad space, coverings for the frames, bars attached to the frames at the front and rear of the saddle, threaded bolts fixed to said bars, adjustable cross bars having slots arranged to receive the said threaded bolts and clamping nuts engaging the bolts for securing the cross bars tightly to the bars attached to the frames.

2. In a bicycle saddle, two metal frames forming the saddle halves, having front extensions forming an elongated pommel, said halves having their outer edges curved to correspond to a human upper thigh and having their inner edges curved away from each other at the middle part of the saddle to form a broad space, said space extending throughout the whole of the saddle, coverings for the frames, bars attached to the frames at the front and rear of the saddle, threaded bolts fixed to said bars, adjustable cross bars having slots arranged to receive the said threaded bolts and clamping nuts engaging the bolts for securing the cross bars tightly to the bars attached to the frames.

In testimony, that I claim the foregoing as my invention, I have signed my name in presence of two witnesses, this 6th day of August, 1906.

THURE FREDRIK HAMMARÉN.

Witnesses:
PAUL ARRAS,
CHEMNITZ H. SCHILLING.